Jan. 18, 1966 — W. B. VALACICH — 3,229,361
METAL REPAIRING
Filed Aug. 7, 1964 — 2 Sheets-Sheet 2
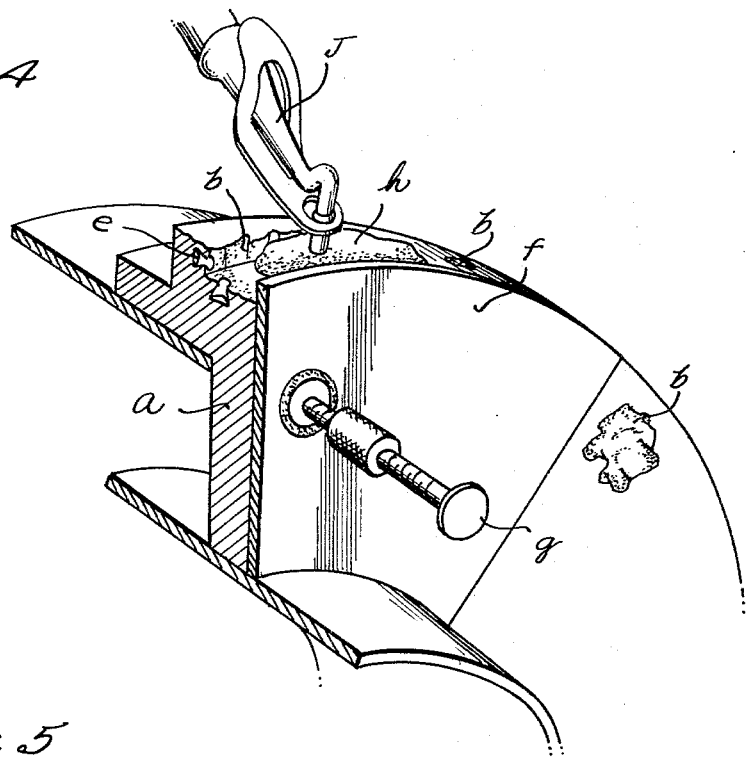
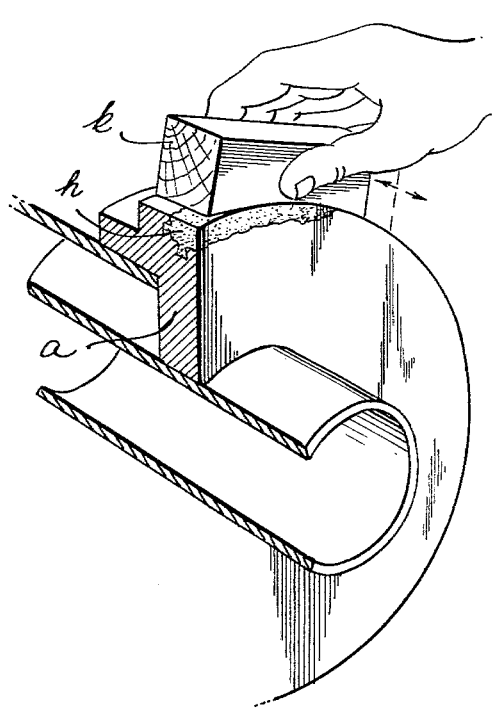
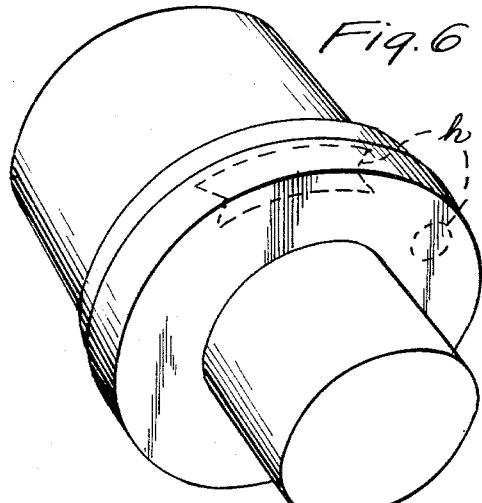
INVENTOR
WALTER B. VALACICH
BY Cushman, Darby & Cushman
ATTORNEYS

United States Patent Office 3,229,361
Patented Jan. 18, 1966

3,229,361
METAL REPAIRING
Walter Barry Valacich, 1626 1st Ave. S.,
Great Falls, Mont.
Filed Aug. 7, 1964, Ser. No. 388,329
5 Claims. (Cl. 29—401)

This invention relates to metal repairing, and more particularly to a process for restoring metal which has at least one hole or the like such as may have been caused by pitting, for example.

While the process of this invention may be employed to repair or restore metal of any kind which has been employed in any situation, the present specification proceeds to discuss the process and its applicability particularly to the repair of metals which have become pitted because of their use in electrical or electronic environments, including high frequency usages, where arcing or the like is especially possible. In greater particular, this process relates to the repair and rehabilitation of high voltage electrical terminals or conductors or contacts which have been damaged by electrical arc pitting of the metal during its use as part of any electrical or electronic equipment or device.

The process according to the present invention of repairing, restoring, or rehabilitating pitted metal, employs dental cavity filling techniques, well known to a dentist, but unknown in the art of metal repair. For example, in greater detail the invention contemplates repairing the surface which forms the pit hole, to receive and retain a filling material. This step of repairing the hole surface preferably includes cleaning the hole and undercutting the surface, especially at its edges, and in recesses in the floor of the surface, too, if desired. Then, an amalgam is prepared and condensed into the hole. Preferably the hole is overfilled and the excess amount of amalgam is removed after it has substantially set and thereby been secured by the undercut surface. The resultant restoration is thereby made smooth and conforms to the contour of the original metal surface, giving a strong product which is as good as, if not better than, the original metal, and which will operate in the same electrical or electronic senses previously required of the metal.

It is therefore a principal object of this invention to provide a process for restoring metal which has become pitted or the like, by filling the pit with a putty-like material, such as amalgam, to effect a restoration which is strong and permanent.

Another object of this invention, in conjunction with the foregoing object, is the provision of a process which includes the further detailed steps of preparing the surface forming the pit by cleaning and undercutting that surface, then overfilling the resultant pit with an amalgam, allowing the amalgam to set after being condensed, and then removing the excess amounts of the amalgam to provide a smooth and contoured restoration.

Other objects and advantages of this invention will become apparent to those of ordinary skill in the art upon reading the appended claims and the following detailed description of the invention in conjunction with the attached drawings, in which:

FIGURE 4 is a cross sectional perspective showing a matrix clamped in place for forming a side wall of the pit while it is being filled by means of a dental amalgam ejector;

FIGURE 5 is a cross sectional perspective view showing a hardened restoration being polished; and FIGURE 6 is a full perspective showing a section of the FIGURE 1 tube, similar to the section of FIGURE 2, with its cavity end plate fully restored with hardened polished amalgam that has been contoured.

It is well known that through normal usage many klystron tubes have a life span of approximately four months when utilized at full operating capacity though some may last up to two years or so. This short life span is a direct result of pitting of metal such as the copper rings used for contact. The same problem occurs when a malfunction occurs in the circuit causing an arc to be produced. In both instances, pitting of the contact area occurs whether by malfunction of the circuit or through normal use. The end result is therefore a klystron tube that is useless, because the burned or pitted areas thereof do not afford even contact.

In the past, when klystron tubes have become useless due to pitting, either replacement parts were obtained if this was considered feasible, or the tubes are discarded and replaced by new ones. When it is appreciated that the cost of a single klystron tube may be in the neighborhood of eleven hundred dollars for small tubes and many thousands of dollars for large ones, and that numerous of such tubes are employed throughout the world in well known situations, it immediately becomes apparent that a process by which any such pitted tube can be repaired should save a tremendous amount of expense. The present invention provides for such a process with repair costing an insignificant amount, for example less than ten dollars for supplies and only two to four man hours at most of work, effecting a substantial, if not phenomenal reduction in expense. Furthermore, the klystron tubes that are repaired in accordance with this invention are restored with such strength that there is no problem in this regard at all, for the klystron tube may be operated at optimum efficiency thereafter without any problem of the restoration ever pitting.

Figure 1:
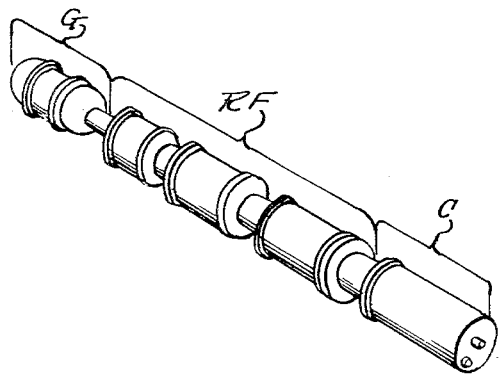
FIGURE 1 illustrates in perspective a klystron type high frequency radio tube.
Figure 2:
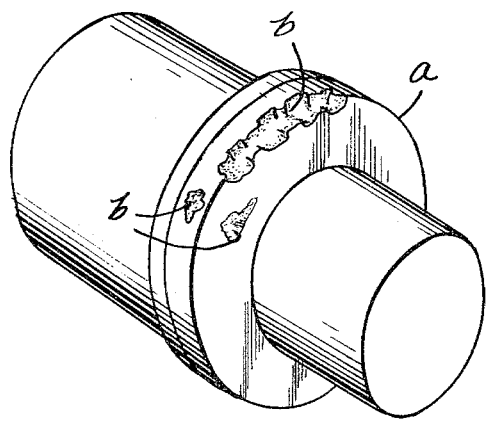
FIGURE 2 is an enlarged view of a portion of the FIGURE 1 tube, with parts thereof pitted.

A klystron tube of the kind generally referred to in this application is illustrated in FIGURE 1 as having an electron gun section G, a radio frequency section RF, and a collector section C. The indication portion of that tube is shown in enlarged form in FIGURE 2 with a copper cavity end plate $a$ having a plurality of burned out holes or pits $b$, such as may have been caused by high voltage arcing. As above indicated, when a klystron tube has an end plate that is pitted as shown in FIGURE 2, it becomes useless because it cannot perform its necessary or desired contact function required in a klystron. According to the present invention, the copper end plate is restored to normal, and this is accomplished by making use of dental cavity filling techniques.

Figure 3:
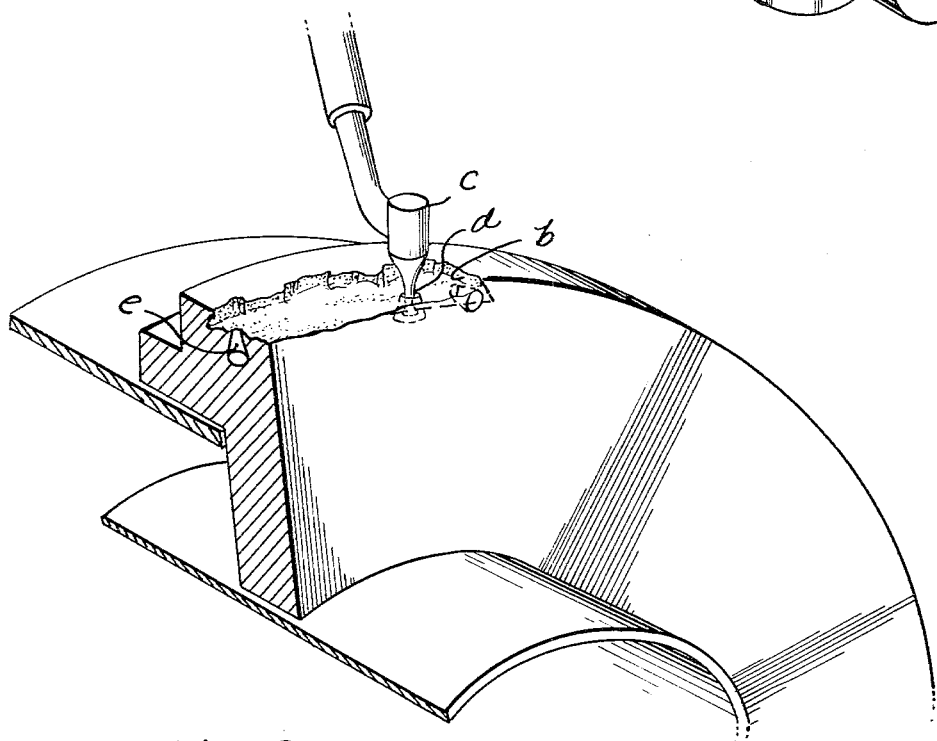
FIGURE 3 is a cross sectional perspective view illustrating the step of cleaning and undercutting a pit.

A first step in effecting th e restoration is preferably the cleaning of the pits $b$, i.e., removing the black crusty material therefrom that results from arcing. Then, each cleaned pit is undercut; that is, the surface forming the cleaned pit $b$ is undercut, for example as illustrated in FIGURE 3. A high speed drill $c$ of the dental type for example, with an inverted cone burr $d$ or the like is employed to undercut not only the edges of the cleaned pit, but also the bottom or side surfaces thereof with keyed holes or conically shaped recesses $e$. The purpose of the undercutting step in the process is to prepare the surface of the pit to retain the filling material which is to be deposited therein. This is a mechanical type of retention, as will be apparent. The angle of undercut either at the edges of the pit or in the recesses $e$ on the floor of the pit, are preferably in the range of from about 5° to about 10° or slightly larger, in order to give the desired mechanical holding ability.

Regular dental techniques of using drill $c$ are preferably employed, for example the use of both hands with the drill being slightly reciprocated in both rotative and longitudinal senses to relieve pressure and the like. Undercutting for present purposes, as indicated, may be at an angle larger than 5°, i.e., an angle generally more than used in dentistry. Of course, the larger the area of the pit, the more undercutting desired.

After the pit is drilled, it is preferably dust cleaned, for example by use of air pressure from a dental chip blower or the like. The pit can further be cleaned with cotton swabs of isopropyl alcohol or the like which dries away by evaporation and leaves the pit free of moisture. A moisture free, clean cavity is quite important from the standpoint of preventing corrosion of the restoration, especially if the filling material contains zinc or some element which will cause corrosion if subjected to a corroding atmosphere.

Since the large undercut pit $b$ in FIGURE 3 extends to two sides of the copper end plate, it is desirable to employ a form, such as matrix $f$ in FIGURE 4, to provide a surface against which the filling material may be disposed to eventually form the side of the restoration. Matrix $f$ preferably has ribs or the like of about $\frac{1}{32}$ inch in height for example, on its inner side to allow space for filling material to protrude outward from the face of the cavity end plate $a$. As will become apparent, this outward protrusion of the filling material is subsequently removed, with the purpose of the protrusion being that the surface may be smoothed and contoured to the original state of the end plate $a$. A build up of approximately five millimeters above the external surface surrounding the pit is desirable to allow for such smoothing, contouring, and polishing of the restoration.

A double-acting screw brace such as a turnbuckle $g$ may be employed to hold matrix $f$ in place, it being understood that the outer end of the turnbuckle $g$ in FIGURE 4 would be pressing against the surface of the end plate of the collector $c$ in FIGURE 1.

The next step in the process is to fill the cavity or pit with a putty-like material. Again, dental techniques are employed, including preferably the use of a dental amalgam. This step includes the preparation of the amalgam and its placement and condensation into the prepared pit. A conventional dental amalgam ejector $j$ may deposit the amalgam $h$ into the pit, with concurrent condensation thereof for purposes of removing excess mercury being accomplished with conventional dental techniques as desired. For example, the amalgam is picked up by ejector $j$ from a container in which it has been prepared, and condensed into recesses $e$ first. More amalgam is obtained by the ejector $j$ and placed in the pit all around, with the number of times that amalgam is picked up being, for example, no more than four or five times, according to the speed of working. Condensation may be accomplished by hand with a regular dental plugger, to prevent porosity and help effect the desired bond. Placement of the amalgam in the pit and condensation by hand are generally done alternately. This process is repeated until the cavity is overfilled, at which time a conventional automatic condenser or hand condensing if desired, is used on all surfaces of the amalgam for a desired time, for example $\frac{1}{2}$ to 1 minute. The surface of the condensed amalgam will therefore become shiny due to excess mercury thereby being caused to precipitate to the top. This excess mercury may be removed by a conventional dental carver or the like. The surface should then be rechecked to make sure it is higher than the original surface of the metal. If it is not, the surface should be roughened first and further amalgam added with the condensation step repeated. The initial set of the amalgam will occur in 5 to 10 minutes, after which carving may be effected to remove the excess restoration roughly to the contour of the original surface.

However, before finally removing all of the excess restoration, the amalgam should be allowed to set until it is sufficiently hard, for example a 24-hour set, after which it may be polished as by means of a formed polishing block $k$ which has conventional abrasives for use on dental amalgams, as shown in FIGURE 5. If desired, such polishing may include use of dental burnishers and finally a fine pumice polish, if desired.

The result is that shown in FIGURE 6 wherein the restorating amalgam $h$ is smooth and polished, with its contour being the same as the original contour of the copper end plate in the areas which were pitted.

One of the objects and advantages of this invention is the provision of a metal repair process which can be done in the field or elsewhere without requiring heat or any melting of the filling material that is to be employed. A silver-tin dental amalgam is therefore the preferable type of filling material. For purposes of information as to the different types of silver-tin dental alloys and amalgams made therefrom and as to procedures for preparing the amalgam therefrom, and other dental techniques which may be employed in carrying out this invention, reference may be made to the book "The Science of Dental Materials," by Rosamond L. Skinner, Saunders Co., 1954, and the American Dental Association booklet "Guide To Dental Materials" second edition, 1964, the contents of both of which are hereby incorporated hereinto by reference. The latter book states ADA specification No. 1 for dental amalgam, giving both physical and chemical characteristics, and preferably those characteristics apply to the silver-tin amalgam which is preferably used as the filling material in this invention. Preferably, the silver-tin alloy which is to be amalgamated with mercury, has a chemical composition of at least about 65% silver, at most about 30% tin, and includes about 0–6% copper, 0–2% zinc and 0–3% mercury. Preferably, the maximum amount of silver in the alloy is about 75%, and preferably the minimum of tin is about 25%. The proportion of the alloy to mercury is a ratio of about 4 to 7 up to approximately 2:3, by weight.

Preferably, the amalgam as it sets or hardens expands so as to prevent any part of the pit from being unfull, thereby in turn preventing possible arcing or the like internally. The dimensional change specification for dental amalgam by the American Dental Association, as set forth in the above mentioned booklet, is that when used in a specified manner the increase in length of an amalgam specimen shall not be less than zero or more than 20 microns per centimeter at the end of 24 hours. This range is preferable for the amalgam used in the present invention, but strict adherence to at least the maximum of that range is not required since the metal being repaired will normally retain expansion except in a direction outwardly of the restoration.

It is desirable that the amalgam employed have a linear coefficient of thermal expansion similar to that of the metal to be restored. Dental amalgams have a coefficient of expansion in the neighborhood of 22 to $28 \times 10^{-6}$ per degree centigrade, while copper has a coefficient of expansion of $16.5 \times 10^{-6}$ per degree centigrade. These two coefficients are closer than that of the dental amalgam compared to the coefficient of expansion of a tooth across its crown, which is $11.4 \times 10^{-6}$ per degree centigrade. Therefore the dental amalgam will expand and contract in general correspondence with pitted copper which has been restored with the amalgam, without tending to leave any spaces between the two or bulging outwardly of the amalgam.

Preparation of an amalgam for use with this invention may be accomplished in any conventional manner. The process of alloying mercury, which is liquid or "molten" at room temperature, with a silver-tin alloy in the solid state is known as "amalgamation," and the procedure of mixing such alloy with mercury is technically known as "trituration." The product of trituration, i.e., the amalgam, is a plastic mass similar to that which occurs in the "melt" of any alloy at temperatures between the liquidus and solidus. Because of the fact that trituration of a dental amalgam can be accomplished at room temperature, this invention lends itself to a ready manner of repairing metal without the use of heat. A mortar and pestle are generally employed for the trituration. Conventional mechanical equipment may be used if desired as is well known in the dental art. Conventional timing for completing an amalgamation may be employed.

As in dentistry, it has been determined that restoration using dental amalgams have considerable strength; for example, a compressive strength of at least 35,600 pounds per square inch, and preferably in the neighborhood of 45,000 pounds per square inch. The flow of the restoration in its hardened form may be in accordance with the above mentioned American Dental Association specification for dental amalgam, in order to provide such strength. The tensile strength of a restoration of dental amalgam according to the present invention, is in the approximate range of 5,000 to 8,000 pounds per square inch. Use of an alloy-mercury ratio of 4:7 to 2:3 as previously mentioned, will provide such strength. Generally speaking, strength increases with the time of hardening, and a restoration usually reaches 70 to 90% of its maximum strength after 6 to 8 hours of hardening. Of course, the conductivity of a silver-tin amalgam is excellent for electrical purposes.

From the foregoing, it is apparent that this invention has provided for all of the objects and advantages herein stated. Other objects and advantages, and even further modifications and embodiments of the invention, will become apparent to those of ordinary skill in the art after reading this disclosure. However, it is to be appreciated that this disclosure is illustrative and not limitative, the invention being described by the appended claims.

What is claimed is:

1. A process for repairing electrically conducting metal parts of electrical devices which parts have been damaged by electrical pitting during use so as to have at least one hole, comprising the steps of:

preparing the surface forming said hole to receive and retain filling material, preparing a condensable, electrically conductive, settable filling material from a silver and tin alloy and mercury to effect an amalgam which expands upon setting and which has, in its set state, a coefficient of expansion similar to that of the metal being restored, overfilling the resultant hole with said amalgam while condensing the amalgam in the hole to remove excess mercury, and removing from the overfilled hole excess amounts of said amalgam after it has substantially set and expanded so as to leave a smooth and contoured electrically conductive restoration, thereby repairing the pitted electrical device so that it is at least as good as the original electrical device and so that it and each repaired metal part thereof will operate in the same electrical or electronic senses previously required thereof.

2. A process as in claim 1 wherein said alloy has at least about 65% silver, at most about 30% tin and includes about 0–6% copper, 0–2% zinc, and 0–3% mercury.

3. A process as in claim 1 wherein the initial weight ratio of alloy to mercury used in preparing said amalgam is at least 4:7.

4. A process as in claim 1 wherein the steps of preparing the amalgam, filling the hole, and condensing the amalgam are done at about room temperature.

5. A process as in claim 1 wherein said surface preparing step includes undercutting the surface forming the edge of said hole and making undercut holes in the remainder of said surface.

References Cited by the Examiner
UNITED STATES PATENTS

| | | | |
|---|---|---|---|
| 2,218,755 | 10/1940 | Kaufmann | 32—15 XR |
| 2,252,986 | 8/1941 | Scott | 29—402 |
| 2,281,991 | 5/1942 | Poetschke | 75—169 XR |
| 2,722,734 | 11/1955 | Grant | 29—401 |

JOHN F. CAMPBELL, *Primary Examiner.*

THOMAS H. EAGER, *Examiner.*